(12) United States Patent
Dölker

(10) Patent No.: US 10,907,564 B2
(45) Date of Patent: Feb. 2, 2021

(54) METHOD FOR OPERATING AN INTERNAL COMBUSTION ENGINE, DEVICE FOR THE OPEN-LOOP AND CLOSED-LOOP CONTROL OF AN INTERNAL COMBUSTION ENGINE, INJECTION SYSTEM, AND INTERNAL COMBUSTION ENGINE

(71) Applicant: MTU FRIEDRICHSHAFEN GMBH, Friedrichshafen (DE)

(72) Inventor: Armin Dölker, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 26 days.

(21) Appl. No.: 16/096,864

(22) PCT Filed: Mar. 13, 2017

(86) PCT No.: PCT/EP2017/000323
§ 371 (c)(1),
(2) Date: Oct. 26, 2018

(87) PCT Pub. No.: WO2017/186325
PCT Pub. Date: Nov. 2, 2017

(65) Prior Publication Data
US 2019/0136784 A1 May 9, 2019

(30) Foreign Application Priority Data

Apr. 28, 2016 (DE) .......................... 10 2016 207 295
Aug. 9, 2016 (DE) .......................... 10 2016 214 760

(51) Int. Cl.
*F02D 41/22* (2006.01)
*F02D 41/38* (2006.01)
*F02M 63/02* (2006.01)

(52) U.S. Cl.
CPC ....... *F02D 41/222* (2013.01); *F02D 41/3863* (2013.01); *F02M 63/025* (2013.01);
(Continued)

(58) Field of Classification Search
CPC .............. F02D 41/222; F02D 41/3863; F02D 2200/0602; F02D 2041/228;
(Continued)

(56) References Cited

U.S. PATENT DOCUMENTS

| 4,471,742 A * | 9/1984 | Kishi ................... F02D 41/2422 123/274 |
| 5,723,780 A * | 3/1998 | Miwa ..................... F02D 41/22 340/439 |

(Continued)

FOREIGN PATENT DOCUMENTS

| DE | 19935519 C2 | 5/2002 |
| DE | 10113722 A1 | 9/2002 |

(Continued)

*Primary Examiner* — Sizo B Vilakazi
*Assistant Examiner* — Brian R Kirby
(74) *Attorney, Agent, or Firm* — Lucas & Mercanti, LLP; Klaus P. Stoffel

(57) ABSTRACT

A method for operating an internal combustion engine with a motor having a number of cylinders and an injection system having a common rail with a number of injectors assigned to the cylinders and similar high pressure components, which is designed to hold fuel from the common rail for the injector, wherein the method has the steps: injecting fuel from the common rail into a cylinder by way of an injector, determining a fuel pressure for a high-pressure component, in particular the common rail, the injector and/or the individual reservoir, having at least one high-pressure sensor measuring the fuel pressure. Provision is made for a defect in the high-pressure sensor to be detected in that a check is made as to whether magnitude of the high-pressure control deviation (ep) during a predetermined (Continued)

time interval ($t_{Limit1}^{SD}$, $t_{Limit2}^{SD}$, $t_{Limit3}^{SD}$) exceeds a predetermined limiting value ($e_{Limit1}^{SD}$, $e_{Limit2}^{SD}$, $e_{Limit3}^{SD}$).

11 Claims, 10 Drawing Sheets

(52) U.S. Cl.
CPC .. *F02D 2041/223* (2013.01); *F02D 2041/227* (2013.01); *F02D 2041/228* (2013.01); *F02D 2200/0602* (2013.01); *F02M 2200/40* (2013.01); *Y02T 10/40* (2013.01)

(58) Field of Classification Search
CPC ......... F02D 2041/227; F02D 2041/223; F02D 2041/224; F02D 41/22; F02M 63/025; F02M 2200/40; Y02T 10/40
USPC ................................. 123/479, 456, 457, 458
See application file for complete search history.

(56) References Cited

U.S. PATENT DOCUMENTS

| | | | | |
|---|---|---|---|---|
| 5,808,189 | A * | 9/1998 | Toyoda | F02D 41/222 |
| | | | | 73/114.37 |
| 6,012,438 | A * | 1/2000 | Joos | F02D 41/1454 |
| | | | | 123/198 D |
| 6,032,639 | A * | 3/2000 | Goto | F02D 41/222 |
| | | | | 123/295 |
| 6,053,147 | A * | 4/2000 | Hemmerlein | F02D 41/222 |
| | | | | 123/198 D |
| 6,234,148 | B1 * | 5/2001 | Hartke | F02D 41/222 |
| | | | | 123/198 D |
| 6,283,108 | B1 * | 9/2001 | Matsufuji | F02D 41/221 |
| | | | | 123/458 |
| 6,886,509 | B2 | 5/2005 | Perez | |
| 7,991,538 | B2 * | 8/2011 | Olbrich | F02D 41/3836 |
| | | | | 701/104 |
| 9,328,689 | B2 | 5/2016 | Dolker | |
| 2004/0249555 | A1 * | 12/2004 | Doelker | F02D 41/222 |
| | | | | 701/107 |
| 2008/0109144 | A1 * | 5/2008 | Hofmeister | F02M 65/003 |
| | | | | 701/103 |
| 2010/0280743 | A1 | 11/2010 | Hehle | |
| 2012/0265424 | A1 * | 10/2012 | Dolker | F02M 63/025 |
| | | | | 701/104 |
| 2013/0125862 | A1 * | 5/2013 | Sahashi | F02M 57/005 |
| | | | | 123/447 |
| 2017/0067409 | A1 | 3/2017 | Dolker | |

FOREIGN PATENT DOCUMENTS

| | | | | |
|---|---|---|---|---|
| DE | 102009050467 | A1 * | 4/2011 | |
| DE | 102009050467 | A1 | 4/2011 | |
| DE | 102009002793 | B4 | 7/2011 | |
| DE | 102014213648 | B3 | 10/2015 | |
| DE | 102015207622 | A1 | 10/2016 | |
| EP | 0899442 | A2 * | 3/1999 | ............ F02D 41/22 |
| EP | 0899442 | A2 | 3/1999 | |
| EP | 2138680 | A1 | 12/2009 | |
| GB | 2456067 | A | 6/2009 | |
| JP | S6116215 | A | 1/1986 | |
| JP | H07208132 | A | 8/1995 | |
| WO | 2011047833 | A1 | 4/2011 | |
| WO | 2013089621 | A1 | 6/2013 | |

* cited by examiner

| $V_{soll}^{DRV}$ [l/min] | | | | | | | | | | | | | | | | | | | | Z |
|---|---|---|---|---|---|---|---|---|---|---|---|---|---|---|---|---|---|---|---|---|
| 0.0 | 0.250 | 0.440 | 0.557 | 0.709 | 0.771 | 0.827 | 0.879 | 0.929 | 0.976 | 1.020 | 1.066 | 1.120 | 1.159 | 1.210 | 1.312 | 1.440 | | | | |
| 0.01 | 0.122 | 0.237 | 0.352 | 0.518 | 0.585 | 0.648 | 0.708 | 0.763 | 0.814 | 0.862 | 0.910 | 0.957 | 1.004 | 1.057 | 1.158 | 1.265 | | | | |
| 0.03 | 0.042 | 0.229 | 0.347 | 0.515 | 0.582 | 0.645 | 0.705 | 0.759 | 0.811 | 0.859 | 0.907 | 0.954 | 1.001 | 1.052 | 1.152 | 1.260 | | | | |
| 0.07 | 0.000 | 0.213 | 0.337 | 0.509 | 0.576 | 0.639 | 0.700 | 0.752 | 0.805 | 0.853 | 0.901 | 0.948 | 0.995 | 1.043 | 1.140 | 1.250 | | | | |
| 0.1 | 0.000 | 0.202 | 0.328 | 0.503 | 0.572 | 0.635 | 0.695 | 0.748 | 0.801 | 0.849 | 0.897 | 0.943 | 0.989 | 1.036 | 1.131 | 1.241 | | | | |
| 0.13 | 0.000 | 0.194 | 0.320 | 0.499 | 0.568 | 0.631 | 0.690 | 0.744 | 0.796 | 0.844 | 0.892 | 0.938 | 0.984 | 1.030 | 1.124 | 1.227 | | | | |
| 0.17 | 0.000 | 0.177 | 0.312 | 0.494 | 0.563 | 0.627 | 0.685 | 0.740 | 0.793 | 0.840 | 0.888 | 0.932 | 0.978 | 1.023 | 1.120 | 1.217 | | | | |
| 0.2 | 0.000 | 0.157 | 0.306 | 0.486 | 0.557 | 0.622 | 0.681 | 0.738 | 0.789 | 0.838 | 0.885 | 0.930 | 0.974 | 1.020 | 1.114 | 1.209 | | | | |
| 0.27 | 0.000 | 0.114 | 0.296 | 0.479 | 0.550 | 0.616 | 0.676 | 0.732 | 0.784 | 0.832 | 0.879 | 0.925 | 0.970 | 1.016 | 1.108 | 1.200 | | | | |
| 0.33 | 0.000 | 0.081 | 0.278 | 0.470 | 0.542 | 0.610 | 0.670 | 0.726 | 0.778 | 0.827 | 0.875 | 0.922 | 0.968 | 1.014 | 1.105 | 1.195 | | | | |
| 0.42 | 0.000 | 0.041 | 0.263 | 0.461 | 0.536 | 0.604 | 0.663 | 0.720 | 0.772 | 0.822 | 0.870 | 0.917 | 0.963 | 1.008 | 1.098 | 1.189 | | | | |
| 0.5 | 0.000 | 0.000 | 0.248 | 0.454 | 0.530 | 0.600 | 0.658 | 0.715 | 0.768 | 0.818 | 0.865 | 0.912 | 0.958 | 1.004 | 1.096 | 1.185 | | | | |
| 0.75 | 0.000 | 0.000 | 0.209 | 0.433 | 0.513 | 0.582 | 0.644 | 0.704 | 0.756 | 0.808 | 0.856 | 0.903 | 0.950 | 0.996 | 1.086 | 1.174 | | | | |
| 1.5 | 0.000 | 0.000 | 0.032 | 0.386 | 0.474 | 0.549 | 0.618 | 0.678 | 0.734 | 0.788 | 0.837 | 0.885 | 0.931 | 0.977 | 1.068 | 1.154 | | | | |
| 3.0 | 0.000 | 0.000 | 0.000 | 0.252 | 0.378 | 0.472 | 0.552 | 0.624 | 0.689 | 0.747 | 0.803 | 0.853 | 0.904 | 0.952 | 1.045 | 1.134 | | | | |
| 6.0 | 0.000 | 0.000 | 0.000 | 0.000 | 0.000 | 0.264 | 0.418 | 0.477 | 0.565 | 0.649 | 0.724 | 0.801 | 0.846 | 0.892 | 1.000 | 1.104 | | | | |
| $P_{mess}$ [bar] | 800 | 900 | 1000 | 1200 | 1300 | 1400 | 1500 | 1600 | 1700 | 1800 | 1900 | 2000 | 2100 | 2200 | 2400 | 2600 | | | | |

W → $I_{soll}^{DRV}$ [A]

FIG. 6

METHOD FOR OPERATING AN INTERNAL COMBUSTION ENGINE, DEVICE FOR THE OPEN-LOOP AND CLOSED-LOOP CONTROL OF AN INTERNAL COMBUSTION ENGINE, INJECTION SYSTEM, AND INTERNAL COMBUSTION ENGINE

CROSS-REFERENCE TO RELATED APPLICATIONS

The present application is a 371 of International application PCT/EP2017/000323, filed Mar. 13, 2017, which claims priority of DE 10 2016 207 295.1, filed Apr. 28, 2016, and DE 10 2016 214 760.9, filed Aug. 9, 2016, the priority of these applications is hereby claimed and these applications are incorporated herein by reference.

BACKGROUND OF THE INVENTION

The invention concerns a method for operating an internal combustion engine with an engine comprising a number of cylinders and an injection system with high-pressure components, in particular an injection system comprising a common rail with a number of injectors associated with the cylinders, in particular wherein a single reservoir is associated with an injector that is embodied to provide fuel from the common rail for the injector. The method further includes the steps:
- injecting fuel from the common rail into a cylinder by means of an injector,
- determining a fuel pressure for a high-pressure component, in particular the common rail, the injector and/or the single reservoir, with at least one high-pressure sensor for detecting the fuel pressure.

The invention also concerns a device for controlling and/or regulating an internal combustion engine, with an engine controller and an injection computer module that are designed for carrying out the method according to the invention.

The concept of an injector with a single reservoir has proven itself in the context of a common rail injection system, as for example described in DE 199 35 519 C2 by way of example. The single reservoir is supplied with fuel under pressure via a fuel delivery channel from the pressure connector and has a direct flow connection to the high-pressure channel for the fuel under high pressure in the common rail. The volume of the single reservoir is large compared to the volume of the high-pressure channel and the nozzle antechamber in the injector. Because of the arrangement of the injector—possibly decoupled from the common rail by means of a choke element—in the housing of the fuel injector there is sufficient space in the single reservoir to provide fuel for at least one entire injection quantity for a working cycle of a cylinder, but in any case for a partial injection during the working cycle.

DE 10 2009 002 793 B4 discloses a single reservoir with a pressure measuring device that is embodied in the form of a strain gauge, wherein the strain gauge is embodied in the form of a strain gauge strip and is disposed on the outside of a wall of the single reservoir and a hydraulic resistance is disposed directly upstream or downstream of the single reservoir for integration in the high-pressure feed.

From the German patent application DE 10 2009 050 467 A1, a method for controlling and regulating an internal combustion engine arises, with which in normal mode the rail pressure is regulated by means of a suction choke on the low-pressure side as a first pressure control element in a rail pressure control circuit, and at the same time the rail pressure is subjected to a rail pressure interference variable via a pressure regulating valve on the high-pressure side as a second pressure control element by driving the volumetric flow of a pressure regulating valve from the rail into a fuel tank via the pressure regulating valve on the high-pressure side, and which on detecting a defective rail pressure sensor is changed to an emergency mode, in which the pressure regulating valve on the high-pressure side and the suction choke on the low-pressure side are actuated depending on the same target variable.

DE 10 2014 213 648 B3 discloses a method with a normal mode in which a high-pressure interference variable is produced via a pressure regulating valve on the high-pressure side as a second pressure control element, by means of which fuel is driven from the high-pressure reservoir into a fuel reservoir, wherein the high pressure is regulated in a protective mode using the pressure regulating valve by means of a second high-pressure control circuit, or the pressure regulating valve is permanently open in the protective mode.

The concept is still in need of improvement regarding the reliability of the pressure measurement.

It is therefore desirable that the operation of the high-pressure sensor is determined in a reliable manner and/or in an improved manner. In order to satisfy the aforementioned requirements in an improved manner, a method will be specified that detects a defect of the high-pressure sensor and thus enables differentiated diagnostics and targeted measures for reliable operation of the internal combustion engine.

SUMMARY OF THE INVENTION

At this point, the invention recognizes that the object thereof is to specify a method that detects, in particular recognizes, the operation of the high-pressure sensor in a reliable manner and/or in an improved manner.

The invention is based on a method for operating an internal combustion engine with an engine comprising a number of cylinders and an injection system comprising a common rail with a number of injectors associated with the cylinders and similar high-pressure components, in particular wherein a single reservoir is associated with an injector and is embodied to provide fuel for the injector from the common rail, wherein the method has the steps:
- injecting fuel into a cylinder from a common rail by means of the injector,
- determining a fuel pressure for a high-pressure component, in particular the common rail and/or the single reservoir, with at least one high-pressure sensor that detects the fuel pressure.

According to the invention, with the method the steps are provided whereby a defect of the high-pressure sensor is detected by checking whether the magnitude of a high-pressure control error exceeds a predetermined limit value during a predetermined period of time.

In simple terms, the concept of the invention envisages checking whether the measurement value of the high-pressure sensor remains at a constant value or whether the variation of the measurement value lies within a limited range of values.

The device is used for controlling and/or regulating an internal combustion engine, with an engine controller and an injection computer module that are designed for carrying out the method according to the invention.

The injection system is provided with a common rail for an internal combustion engine with an engine comprising a number of cylinders and a number of injectors associated with the cylinders, wherein a single reservoir is associated with an injector and is embodied to provide fuel from the common rail for injection into the cylinder and with a device for controlling and/or regulating an internal combustion engine.

The internal combustion engine comprises an engine comprising a number of cylinders and an injection system with a common rail and a number of injectors.

The invention is based on the consideration that if the output voltage and hence the measurement value of the high-pressure sensor remains at a constant value because of a defect or the variation of the measurement value is within a limited range of values, no sensor defect is detected with current methods.

This can cause problems, in particular with engines that have no mechanical excess pressure valve installed and instead have a pressure regulating valve. On the one hand, this involves shutting off the engine if the sensor defect occurs if the measurement value is above the setpoint high pressure. On the other hand, this involves unstable high-pressure or revolution rate behavior and thus excessive mechanical stress if the sensor defect occurs when the measurement value is below the setpoint high pressure.

In detail, according to the idea of the invention this means:

If the measurement value of the high-pressure sensor remains at a value that lies above the high-pressure regulator setpoint value, the high-pressure regulator has a negative high-pressure control error as an input variable. The result of this is that the setpoint volumetric flow is less than the control variable of the high-pressure control circuit. A reduction of the setpoint volumetric flow results in an increase in the PWM signal of the suction choke, so that the suction choke is closed and the actually present high pressure reduces, whereby the engine is finally shut off.

If the measurement value of the high-pressure sensor remains at a value that is below the high-pressure regulator setpoint value, the high-pressure regulator has a positive high-pressure control error as the input variable. The result of this is that the setpoint volumetric flow is greater than the control variable of the high-pressure control circuit. An increase in the setpoint volumetric flow results in a reduction of the PWM signal of the suction choke, so that the suction choke is opened and the actually present high pressure rises. The characteristic of the pressure regulating valve is stored in the pressure regulating valve characteristic field. The output variable of the pressure regulating valve characteristic field is the electrical pressure regulating valve setpoint current, and the input variables are the measured high pressure and the pressure regulating valve setpoint volumetric flow that is to be controlled.

If the high-pressure measurement value remains constant and the pressure regulating valve setpoint volumetric flow is constant, then the pressure regulating valve is energized with a constant current value. If the actual high pressure now increases, the energization level of the pressure regulating valve is no longer sufficient to hold said valve closed, i.e. with increasing high pressure, the pressure regulating valve is ever more opened. During this, the high pressure increases until there is equilibrium between the supply quantity and the sum of the pressure regulating valve discharge amount, the injection volumetric flow and the leakage volumetric flow. If the high pressure now decreases again, the pressure regulating valve is closed again. As the suction choke continues to be fully open, the high-pressure increases again as a result etc. As a result, overall there is a limit cycle, i.e. a cyclical variation of the high pressure. The connection between the high-pressure control circuit and the revolution rate control circuit is specified by the injector's characteristic field. The injector's characteristic field has the setpoint injection quantity and the measured high pressure as input variables. The output variable is the energization period of the injector.

If the measured high pressure remains constant, then the injector's characteristic field has a constant high-pressure value as the input variable thereof. If the actual high pressure carries out cyclical movements, the calculated energization period is not correct. The result of this is that the engine revolution rate also carries out cyclical oscillations. Said instability results in increased mechanical stress on the engine, whereby said engine can be damaged.

The invention has now recognized that a targeted recognition of a defect of a high-pressure sensor improves the diagnosis and thus the options for influencing the operation for protecting the internal combustion engine. This applies in particular in comparison with the prior art, where a defect of this type would not be detected and hence the high-pressure control circuit that is only represented as an illustration in FIG. 4 by way of example would be provided with an incorrect measurement variable in the feedback. This would have the result, as already illustrated, that the engine is either shut off or is excessively stressed by cyclical oscillations of the engine revolution rate. Therefore, the method according to the invention enables a controlled procedure for detecting a defect of the high-pressure sensor; i.e., by checking whether the magnitude of the high-pressure control error exceeds a predetermined limit value during a predetermined period of time. Advantageously, if required the internal combustion engine can be placed into a safe emergency mode in the event of a defect of the high-pressure sensor.

Advantageously, it has been recognized that the implementation of the method for detecting a defect of the high-pressure sensor without using additional sensors has considerable advantages in relation to the robustness and efficiency of the method. In particular, the possibility of an implementation of the analysis algorithms described in the application that saves memory space and computing time contributes to this.

Moreover, it has been recognized that differentiated diagnostics is not only advantageous for the direct control of the internal combustion engine, but also for the long-term logging and analysis of engine data. This particularly applies to the use of field data during the analysis of frequencies of occurrence of faults and alarms by the development department, for example.

Advantageous developments of the invention are to be found in the subordinate claims and in particular specify advantageous ways to realize the concept described above in the context of the specification of the object and regarding further advantages.

Advantageously, it is provided that a defect of the high-pressure sensor is detected, wherein the defect is detected by detecting the variation with time of an output value of the at least one high-pressure sensor and detecting a constant profile or only a limited variation of the profile of the detected output value in a predetermined limited range of values. The limited range of values mentioned in the context of the problem and the specification of the object of the invention is thus defined in the context of the development as a predetermined limited range of values.

In the context of a first particularly preferred development version, it is provided that according to the invention a defect in the high-pressure sensor is detected by checking whether the magnitude of the high-pressure control error continuously exceeds a predetermined limit value during a predetermined period of time. Advantageously, at the same time a further check is carried out as to whether the output value of the high-pressure sensor remains in a range that is defined by a maximum deviation during the same predetermined period of time.

Advantageously, in the context of a second particularly preferred development version a check is carried out as to whether the magnitude of the high-pressure control error exceeds a predetermined limit value during a predetermined period of time, in particular the total time. In particular, a check is carried out as to whether the measured high pressure changes by the maximum deviation up to the expiry of said total time of the predetermined period of time; for example, whether the measured high pressure changes by for example no more than $\pm 0.5 * \Delta P_{Limits}^{SD}$ up to the expiry of said total time of the predetermined period of time. This means in particular that the period of time during which the variation of the measured high pressure is checked is equal to or greater than the period of time during which the high-pressure control error exceeds the limit value.

Advantageously, in the context of a third particularly preferred development version, a check is made as to whether the magnitude of the high-pressure control error continuously exceeds a predetermined limit value during a predetermined period of time.

All three development versions have in common that the high-pressure control error is used for determining a high-pressure sensor defect. Further, regarding the first and second development versions it is provided in any case that for the predetermined limited range of values a predetermined period of time and a maximum deviation of a range of pressure values is made available and the variation of the detected output value is detected in the predetermined limited range of values using the test condition that the detected output value does not exceed the maximum deviation over the predetermined period of time.

Specifically, in this case for detecting a fault condition a check is made as to whether the output values of the high-pressure sensor detecting the fuel pressure over the limited time period lie within a range of pressure values of a predetermined width by the value of a last measured output value. The advantage of said procedure lies in the possibility, besides only a constant numerical value as the condition for detecting a defect, to define a range of pressure values about the last measured value, in which the measurement value varies in the event of a defect. This enables small fluctuations in the voltage of the measurement signal to be taken into account when detecting the defect, for example.

In the context of a particularly preferred development, it is provided that a setpoint high pressure is provided with a predetermined limit value of a high-pressure control error and the variation of the detected output values in the predetermined limited range of values is detected by using the further test condition that the detected output values do not lie in a control range of the setpoint high pressure formed by the predetermined limit value of a high-pressure control error over the predetermined period of time.

Specifically, for detecting the fault condition a check is carried out as to whether the output values of the high-pressure sensor detecting the fuel pressure deviate from the setpoint high pressure at least by a limit amount. Advantageously, for the target case in the normal mode of a measurement value of the high-pressure sensor lying in the control range of the setpoint high pressure, no defect is detected in the high-pressure sensor despite meeting the condition described above.

Advantageously, it is provided that the setpoint high pressure has a variable profile that lies both within and outside the range of pressure values and the profile of the detected output value is detected as constant or only slightly variable, in particular as lying within the predetermined limited range of values. In addition, the further test condition is used that the detected output values remain within the range of pressure values characterized by the threshold value for the predetermined limited range of values over a further limited time period, and the further limited time period is not made up of contiguous individual time periods that are accumulated to form a total time period, and during one or a number of or all individual time periods the magnitude of the high-pressure control error exceeds a predetermined limit value.

In particular, non-contiguous individual time periods, in which the output values of the high-pressure sensor meet the test condition, are accumulated to form a total time period and the fault case is to be detected if the total time period is greater than a further limit value (in the exemplary embodiment $t_{Limit3}^{SD}$).

This preferably specifically includes that in the case of an output value of a high-pressure sensor detecting the fuel pressure that is non-variable or that only varies within a limited range, and at the same time a setpoint high pressure lies both within and outside the range of pressure values, the individual time periods in which the output values of the high-pressure sensor meet the aforementioned check conditions are accumulated to form a total time period.

Exceeding said total time period by more than a limit value constitutes the condition for the activation of the fault condition in this case. The advantage here lies in the possibility that a defect is also reliably detected if for example a periodic passage of the setpoint high pressure through the range of pressure values of the predetermined limited range of values within the limited time period would prevent detection of the defect according to the aforementioned check conditions.

Furthermore, it is advantageously provided that a safe operating state, in particular a safe emergency mode, of the internal combustion engine is brought about in response to the fault condition. The advantage in doing so lies in the possibility that the engine is protected by measures targeted on said fault condition in the case of a defect in the sensor.

Advantageously, it is provided that a fault message is output to the operator of the internal combustion engine as a further response to the fault condition. The advantage in doing so lies in the possibility that the operator of the internal combustion engine, despite the safe operating state of the internal combustion engine, is informed about the defect in order to take suitable measures to remove said defect.

In the context of a particularly preferred first version, it is provided that the length of the limited time period is 4-6 seconds and the magnitude of the threshold value is 2-6 bar.

Advantageously, it is further provided that the internal combustion engine is operated in the safe operating mode with the suction choke open and the pressure regulating valve open. Specifically, this means: in the safe operating mode the high-pressure regulator emergency mode is activated, i.e. both the switch-on duration of the PWM signal of the suction choke and the switch-on duration of the PWM signal of the pressure regulating valve are reduced from the static values thereof to the value 0%. As a result, the suction choke and pressure regulating valve are opened, as both control elements are normally open, and the engine can thus be operated in the safe emergency mode. The advantage of this lies in the possibility that the engine is protected by said measures in the case of a defect of the high-pressure sensor. In particular, the opening of the pressure regulating valve constitutes a protective function for the engine because of the lack of an overpressure valve, i.e. the original function of the mechanical (passive) overpressure valve is reproduced electronically.

Embodiments of the invention are now described below using the drawing. This shall not necessarily represent the embodiments to scale, rather the drawing, where appropriate for explanation, is carried out in a schematic and/or slightly distorted form. In relation to additions to the lessons that can be learned directly from the drawing, reference is made to the relevant prior art. In doing so, it is to be taken into account that diverse modifications and changes concerning the form and the detail of an embodiment can be carried out without departing from the general idea of the invention. The features of the invention disclosed in the description, in the drawing and in the claims can be significant for the development of the invention both individually and in any combination. In addition, all combinations of at least two of the features disclosed in the description of the drawing and/or the claims fall within the scope of the invention. The general idea of the invention is not limited to the exact form or the detail of the preferred embodiments shown and described below or limited to a subject matter that would be limited compared to the subject matter that is claimed in the claims. In the case of specified dimensional ranges, values lying within said limits shall thus be disclosed as limit values and can be arbitrarily used and claimed. For the sake of simplicity, the same reference characters are used below for identical or similar parts or parts with identical or similar functions.

BRIEF DESCRIPTION OF THE DRAWING

Further advantages, features, and details of the invention arise from the following description of the preferred embodiments and using the drawing; in the figures:

FIG. 6 shows a pressure regulating valve characteristic field.

DETAILED DESCRIPTION OF THE INVENTION

Figure 1:
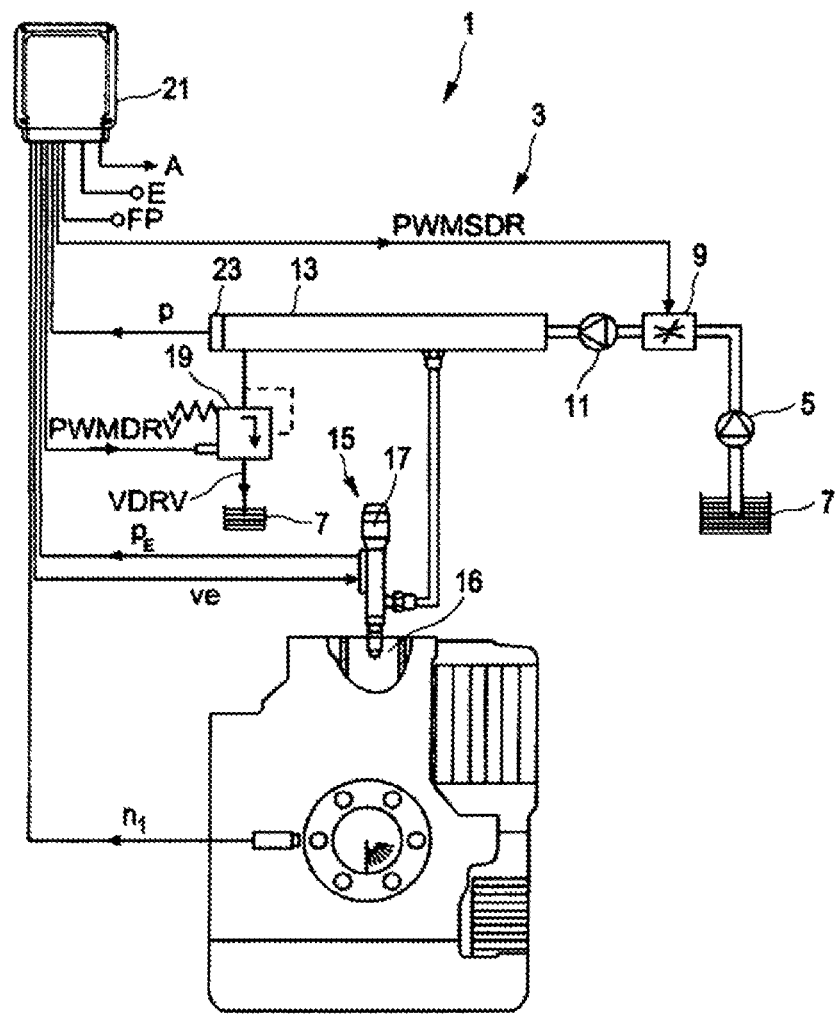
FIG. 1 shows a device for controlling an injection system of an internal combustion engine.

FIG. 1 shows a device corresponding to the prior art as described in DE 10 2014 213 648 B3. In this case, an internal combustion engine 1 comprises an injection system 3. The injection system 3 is preferably embodied as a common rail injection system. It comprises a low-pressure pump 5 for supplying fuel from a fuel reservoir 7, an adjustable suction choke 9 on the low-pressure side for influencing a fuel volumetric flow flowing to a high-pressure pump 11, the high-pressure pump 11 for supplying the fuel under raised pressure into a high-pressure reservoir 13, the high-pressure reservoir 13 for storing the fuel, and preferably a number of injectors 15 for injecting the fuel into combustion chambers 16 of the internal combustion engine 1. Optionally, it is possible that the injection system 3 is also implemented with individual reservoirs, wherein for example a single reservoir 17 is integrated within the injector 15 as an additional buffer volume. With the exemplary embodiment illustrated here, an in particular electrically actuatable pressure regulating valve 19 is provided, by means of which the high-pressure reservoir 13 is fluidically connected to the fuel reservoir 7. By means of the pressure regulating valve 19, a volumetric fuel flow is defined that is discharged from the high-pressure reservoir 13 into the fuel reservoir 7. Said volumetric fuel flow is denoted by VDRV in FIG. 1 and in the following text and is a high-pressure interference variable of the injection system 3.

The injection system 3 comprises no mechanical excess pressure valve, as the function thereof is carried out by the pressure regulating valve 19. The manner of operation of the internal combustion engine 1 is determined by an electronic control unit 21 that is preferably embodied as an engine control unit of the internal combustion engine 1, namely as a so-called Engine Control Unit (ECU). The electronic control unit 21 contains the usual components of a microcomputer system, for example a microprocessor, I/O modules, buffer and memory modules (EEPROM, RAM): the relevant operational data for the operation of the internal combustion engine 1 are applied in characteristic fields/characteristic curves in the memory modules. Using the same, the electronic control unit 21 calculates output variables from input variables. In FIG. 1, the following input variables are shown by way of example: A measured, still unfiltered high pressure p that prevails in the high-pressure reservoir 13 and that is measured by means of a high-pressure sensor 23, a current engine revolution rate $n_1$, a signal FP for specifying power by an operator of the internal combustion engine 1, and an input variable E. The input variable E is preferably a combination of further sensor signals, for example a charging air pressure of an exhaust turbocharger. With an injection system 3 with individual reservoirs 17, an individual storage pressure $p_E$ is preferably an additional input variable of the control unit 21.

In FIG. 1 a signal PWMSDR for actuation of the suction choke 9 as a first pressure control element, a signal ve for actuation of the injector 15—which in particular specifies a start of injection and/or an end of injection or even a duration of injection—, a signal PWMDRV for the actuation of the pressure regulating valve 19 and thereby the high-pressure interference variable VDRV are defined as output variables of the electronic control unit 21 by way of example. The output variable A is representative of further control signals for controlling and/or regulating the internal combustion engine 1, for example for a control signal for the activation of a second exhaust turbocharger in the case of multi-stage turbocharging.

Figure 2:
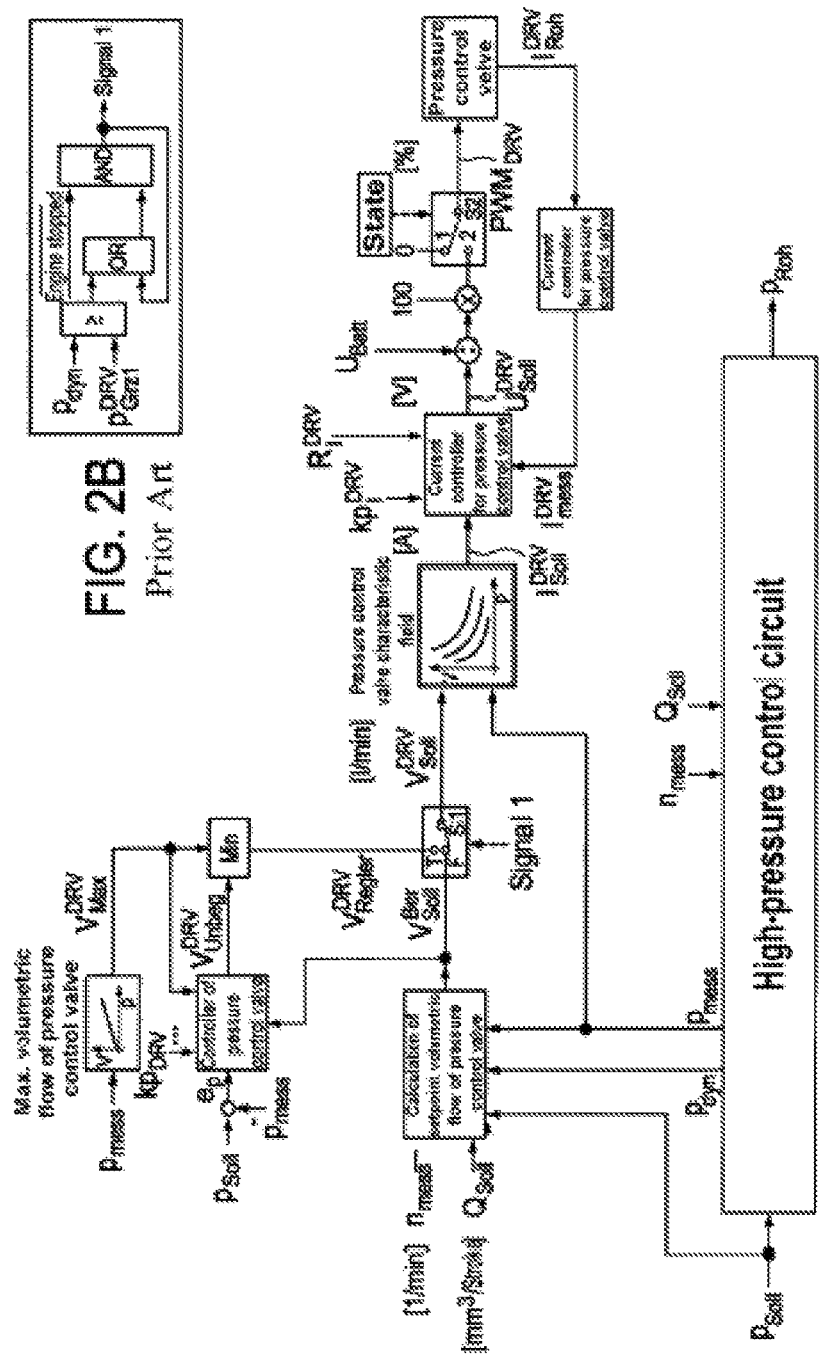
FIG. 2A shows a block diagram of the actuation of a pressure regulating valve when there is no excess pressure valve.
FIG. 2B shows an influence diagram for the first signal (signal 1) activating the pressure regulating valve controller.

FIG. 2A shows the actuation of the pressure regulating valve according to the prior art. The setpoint volumetric flow $V_{Soll}^{DRV}$ of the pressure regulating valve is calculated depending on at least one of the following variables: the measured engine revolution rate $n_{mess}$, a signal that determines power, for example, the setpoint injection quantity $Q_{Soll}$, the setpoint high pressure $p_{Soll}$, the measured fuel rail pressure $p_{mess}$ and the dynamic fuel rail pressure $p_{dyn}$. Said calculation is however only valid if the dynamic rail pressure $p_{dyn}$ is less than the limit value $P_{Grz1}^{DRV}$. In this case, the calculated pressure regulating valve setpoint volumetric flow $V_{Soll}^{Ber}$ is equal to the input variable $V_{Soll}^{DRV}$ of the pressure regulating valve characteristic field, because the logic signal 1 adopts the value "false" and thereby the switch S1 takes up the lower switch position. If the dynamic rail pressure $p_{dyn}$ reaches the limit value $p_{Grz1}^{DRV}$, then the signal 1 adopts the logic value "true" and the switch S1 is equal to the upper switch position. The pressure regulating valve setpoint volumetric flow $V_{Soll}^{DRV}$ is thus in this case equal to the limited output $V_{Regler}^{DRV}$ of the pressure regulating valve controller. This means that if the dynamic rail pressure $p_{dyn}$ reaches the limit value $p_{Grz1}^{DRV}$, the fuel rail pressure is always then regulated by the pressure regulating valve controller and indeed until the engine off state is detected, because in this case the variable "engine off" adopts the value 1 and thus the signal 1 adopts the logic value "false", whereby the switch S1 is again equal to the lower switch position. The pressure regulating valve controller has the high-pressure control error $e_p$ as its input variable, which is calculated as the difference of the setpoint high pressure $p_{Soll}$ and the measured high pressure $p_{mess}$. Further input variables of the pressure regulating valve controller are inter alia the maximum pressure regulating valve volumetric flow $V_{Max}^{DRV}$, the calculated pressure regulating valve setpoint volumetric flow $V_{Soll}^{Ber}$ and the proportional coefficient $kp_{DRV}$. The pressure regulating valve controller is preferably implemented as a $PI(DT_1)$ algorithm. In this case, the integrating component (I-component) is initialized with the calculated pressure regulating valve setpoint volumetric flow $V_{Soll}^{Ber}$ at the point in time at which the switch S1 is switched from the lower switch position to the upper switch position. The I-component of the pressure regulating valve controller is limited at its upper end to the maximum pressure regulating valve volumetric flow $V_{Max}^{DRV}$. In this case, the maximum pressure regulating valve volumetric flow $V_{Max}^{DRV}$ is the output variable of a two-dimensional characteristic curve with the measured fuel high pressure $p_{mess}$ as an input variable. The output variable of the pressure regulating valve controller is likewise limited to the maximum pressure regulating valve volumetric flow $V_{Max}^{DRV}$, so that the limited pressure regulating valve controller setpoint volumetric flow $V_{Regler}^{DRV}$ finally results. This is equal to the resulting pressure regulating valve setpoint volumetric flow $V_{Soll}^{DRV}$ if the signal 1 adopts the logic value "true", i.e. if the switch S1 is in the upper switch position.

The relationship between the dynamic rail pressure $p_{dyn}$, the limit value $p_{Grz1}^{DRV}$ and the variable "engine off" is represented in FIG. 2B regarding the influence thereof on the signal 1.

The pressure regulating valve characteristic field calculates the pressure regulating valve setpoint current $I_{Soll}^{DRV}$ from the resulting pressure regulating valve setpoint volumetric flow $V_{Soll}^{DRV}$ and the measured rail pressure $p_{mess}$. The pressure regulating valve flow controller determines the pressure regulating valve-setpoint voltage $U_{Soll}^{DRV}$ from the pressure regulating valve setpoint current $I_{Soll}^{DRV}$, the measured pressure regulating valve current $I_{mess}^{DRV}$ and further variables, such as the proportional coefficient $kp_1^{DRV}$ and the ohmic pressure regulating valve resistance $R_1^{DRV}$. The switch-on duration $PWM_{DRV}$ of the pressure regulating valve PWM signal is calculated from the pressure regulating valve setpoint voltage $U_{Soll}^{DRV}$ by division by the battery voltage $U_{Batt}$ and then multiplication with the factor 100 if the switch S2 is in the lower switch position. If the switch S2 adopts the upper switch position, then the switch-on duration $PWM_{DRV}$ of the pressure regulating valve PWM signal is specified at 0%. The switch positions of the switch S2 are determined by the "state" variable. If said variable has the value 2, then the lower switch position applies, if said variable has the value 1, then the upper switch position applies. The function of the switch S2 is represented in detail in FIG. 3 in the form of a state transition diagram. The raw values $I_{Roh}^{DRV}$ are in turn filtered through a current filter, so that the measured current $I_{mess}^{DRV}$ results.

Figure 3:
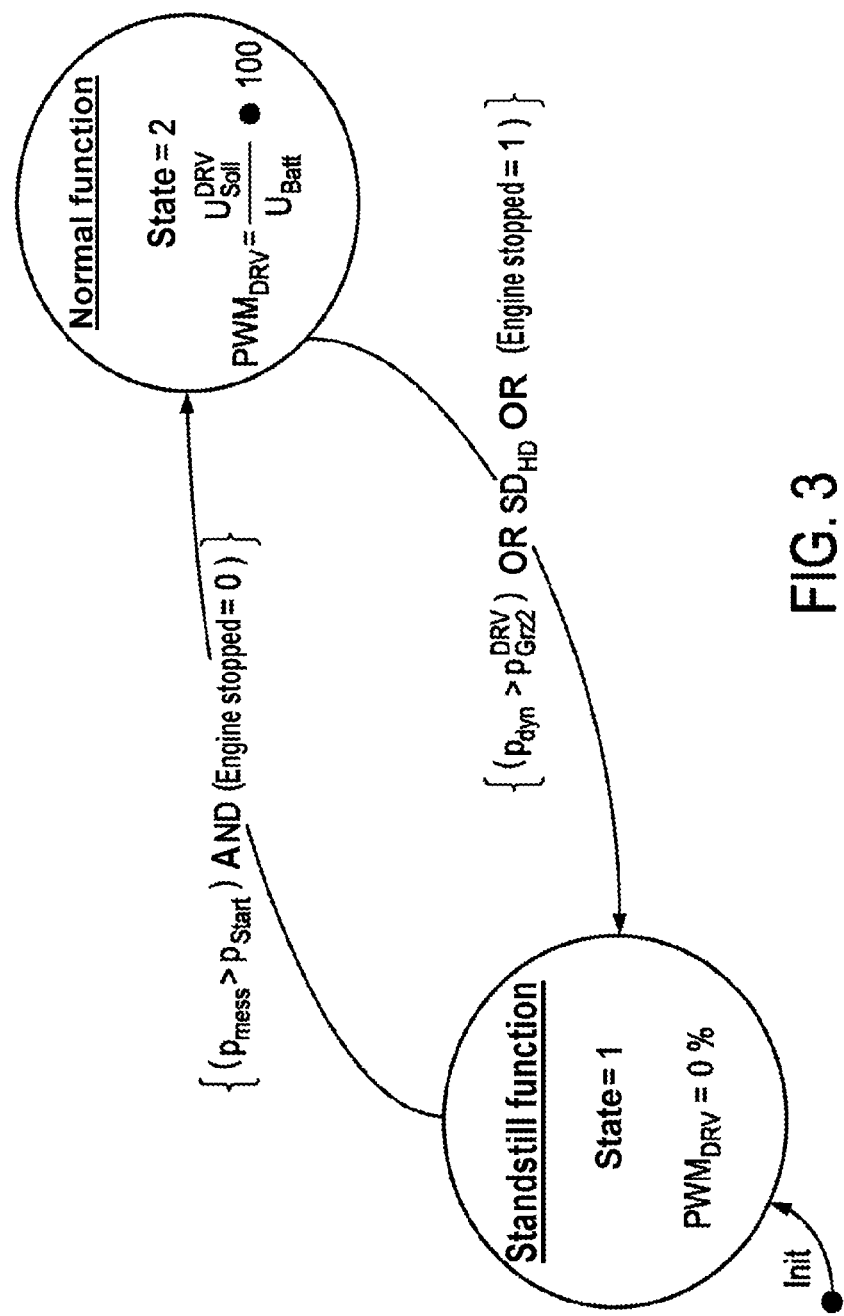
FIG. 3 shows a state diagram of the actuation of the pressure regulating valve when there is no excess pressure valve.

FIG. 3 shows the calculation of the switch-on duration $PWM_{DRV}$ of the pressure regulating valve PWM signal in the form of a state transition diagram for the case of a normally open pressure regulating valve. The state transition diagram consists of two states, which are indicated by the "state" variable. After the switch-on of the engine electronics, at first the engine off function is active. In said state, the "state" variable adopts the value 1 and the switch-on duration $PWM_{DRV}$ of the pressure regulating valve PWM signal is equal to the value 0%. If the measured rail pressure $p_{mess}$ exceeds the limit value $p_{start}$ and if the engine is detected to be running (variable "engine off" is equal to 0), then a change to the normal function is carried out, and in this case the state variable "state" adopts the value 2. The switch-on duration $PWM_{DRV}$ of the pressure regulating valve PWM signal is calculated from the pressure regulating valve setpoint voltage $U_{Soll}^{DRV}$ and the battery voltage $U_{Batt}$. The transition to the first state with a deenergized pressure regulating valve is then carried out if either an engine off state is detected or if there is a defective high-pressure sensor—indicated by the binary variable $SD_{HD}$—or if the dynamic rail pressure $p_{dyn}$ exceeds a limit value $P_{Grz2}^{DRV}$. The opening of the pressure regulating valve in the event of a sensor defect of the high-pressure sensor and on exceeding a pressure limit $p_{Grz2}^{DRV}$ constitutes a protective function for the engine because of the lack of an overpressure valve, i.e. the original function of the mechanical (passive) overpressure valve is reproduced electronically.

FIG. 4A shows the actuation of the suction choke for an arrangement with no excess pressure valve according to the prior art. In FIG. 3, it is shown that the pressure regulating valve is changed to the open state if the dynamic rail pressure $p_{dyn}$ exceeds the limit value $P_{Grz2}^{DRV}$ or if there is a sensor defect of the high-pressure sensor. If one of said two conditions is met, the signal 2 shown in FIG. 4A adopts the value "true" when the engine is running (variable "engine off" is equal to 0) and thereby the switch S changes to the lower switch position. If the lower switch position is active, then the suction choke setpoint current $I_{Soll}^{SDR}$ is equal to the specifiable, preferably constant suction choke current $I_{Notbetrieb}^{SDR}$. In this case, the same is set so that the suction choke can be operated in the open state, for example at the value 0 Amperes. Thus, in the case in which the dynamic rail pressure exceeds the limit value $P_{Grz2}^{DRV}$ or a sensor defect of the high-pressure sensor is detected, a running engine is operated with the pressure regulating valve open and the suction choke open at the same time, whereby stable engine operation is enabled. If the engine is off (variable "engine off" is equal to 1), then the switch S again adopts the upper switch position, so that the suction choke setpoint current $I_{Soll}^{SDR}$ matches the output value $I_{KL}^{SDR}$ of the pump characteristic curve.

In FIG. 3 and FIG. 4B, a sensor defect of the high-pressure sensor is indicated by the variable $SD_{HD}$. A sensor defect of this type can have different causes. According to the prior art, it is usual to check the output voltage of the high-pressure sensor for conformance to lower and upper range limits. A sensor defect is detected for example if in the case of a sensor with the measurement range 5 Volts, the output voltage undershoots the value 0.25 Volts and exceeds the value 4.75 Volts.

It is the object of the disclosure of the invention to detect a failure of the high-pressure sensor for the case of a static measurement value, i.e. for the case in which the output voltage of the sensor remains at a constant value. If the high-pressure sensor fails in this way, this should be indicated by a separate fault message. If a sensor defect caused by violation of the range limits has the designation $SD_{MB}$ and a sensor defect caused by a static measurement value has the designation $SD_{Stehend}$, then the following applies:

$$SD_{HD}=SD_{MB} \vee SD_{Stehend}$$

This means that a sensor defect of the high-pressure sensor results from an OR combination of the two sensor defects $SD_{MD}$ and $SD_{Stehend}$. If a failure of the high-pressure sensor is detected, then regardless of the cause the engine should be transitioned into the safe engine mode represented in FIG. 3 and FIG. 4A, i.e. both the suction choke and the pressure regulating valve should be operated in the open state.

FIG. 4B illustrates the relationship between the dynamic rail pressure $p_{dyn}$, the limit value $p_{Grz2}^{DRV}$, the sensor defect $SD_{HD}$ and the variable "engine off" regarding the influence thereof on the signal 2.

Figure 5:
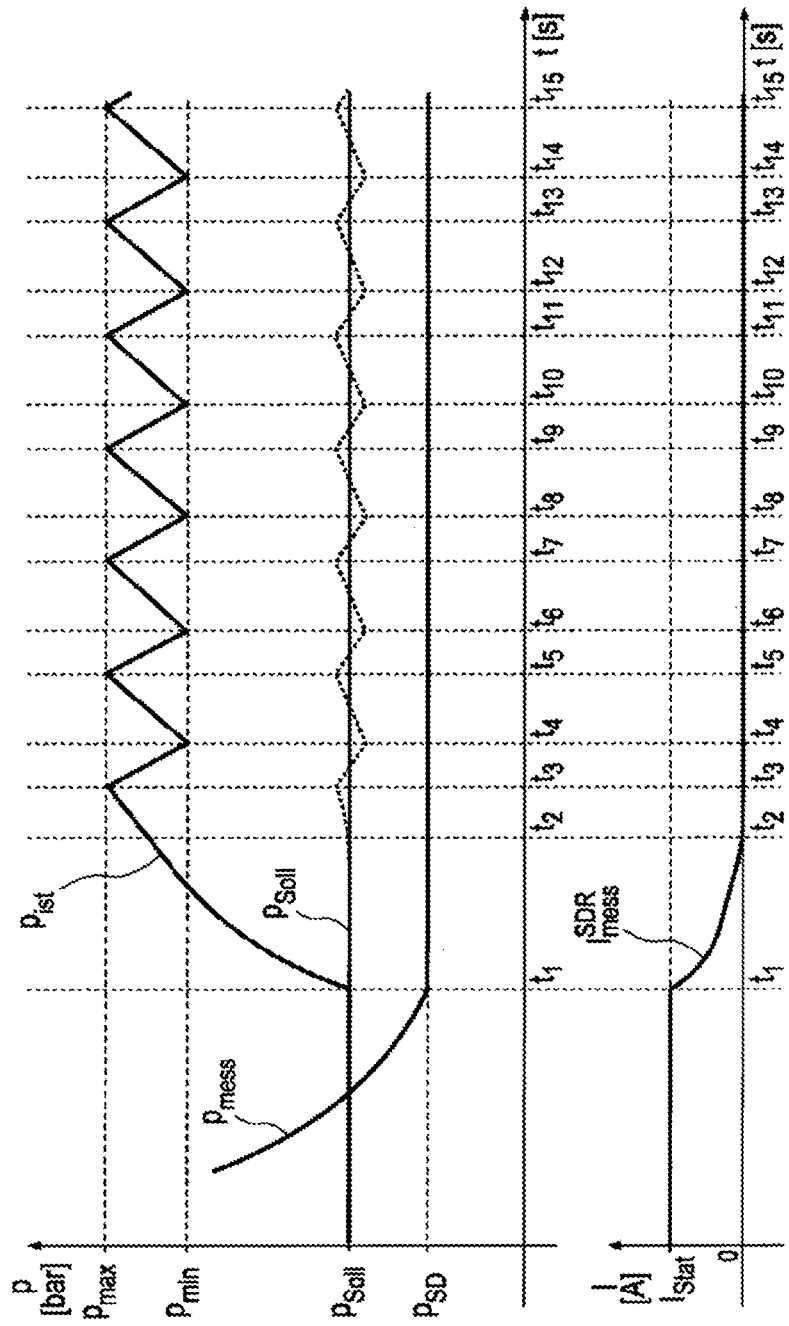
FIG. 5 shows a time profile diagram of a high-pressure sensor failure.

FIG. 5 illustrates how a static measurement value of the high-pressure sensor affects the engine operation, and indeed for the case in which the value of the high pressure lies below the setpoint high pressure. The first time diagram represents profiles of the setpoint high pressure $P_{Soll}$, the high pressure $p_{mess}$ measured by the high-pressure sensor and the actual high pressure $p_{ist}$ present in the rail. At the point in time $t_1$, the high-pressure sensor fails, wherein as a result the measurement value $p_{mess}$ of the high-pressure sensor remains at the value $p_{SD}$. As the profile of the setpoint high pressure $p_{Soll}$ lies above $p_{SD}$, a residual positive high-pressure control error results:

$$e_p>0$$

with $$e_p=p_{Soll}-p_{mess}$$

Figure 4:
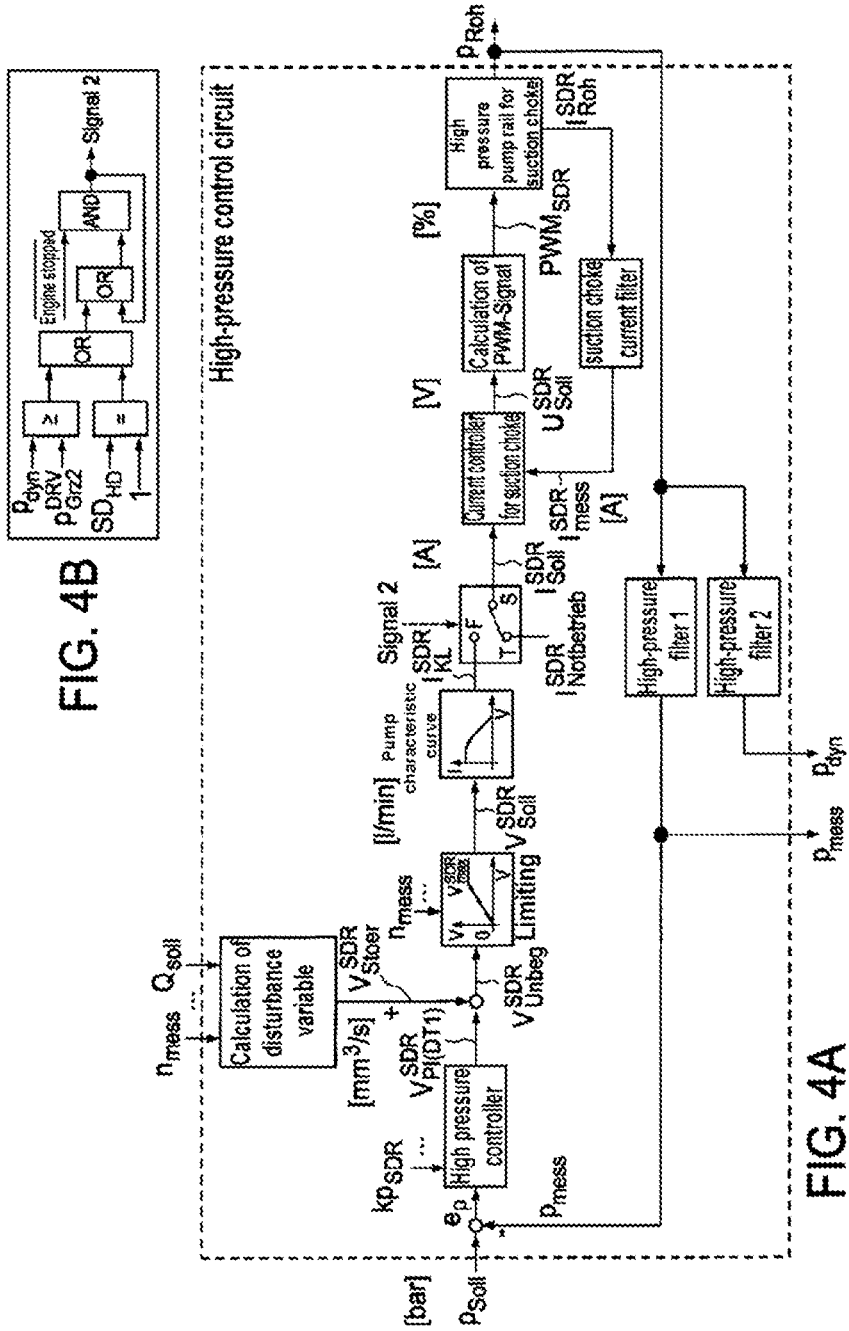
FIG. 4A shows a block diagram of the actuation of a suction choke when there is no excess pressure valve.
FIG. 4B shows an influence diagram for the second signal (signal 2) triggering the emergency mode.

In the event of a positive high-pressure control error, the high-pressure regulator corresponding to FIG. 4 increases the setpoint volumetric flow $V_{Soll}^{SDR}$. In the case of a normally open suction choke, this results in a lower suction choke setpoint current $I_{Soll}^{SDR}$ and finally in a shorter switch-on duration of the PWM signal $PWM_{SDR}$. This results in the measured suction choke current $I_{mess}^{SDR}$ being smaller and the suction choke as a result being operated in the opening direction, i.e. the opening cross-section of the suction choke is increased.

The second diagram in FIG. 5 shows the suction choke current $I_{mess}^{SDR}$, which decreases from the point in time $t_1$ and reaches the value 0 at the point in time $t_2$. The opening of the suction choke results in a rise in the actual rail pressure $p_{ist}$, which is represented in the first diagram, starting from the point in time $t_1$. In order to make the further variation of the rail pressure understood, in FIG. 6 the pressure regulating valve characteristic field is illustrated. The input variables of said characteristic field are the measured high pressure $p_{mess}$ and the setpoint volumetric flow $V_{Soll}^{DRV}$ to be controlled, and the output variable is the pressure regulating valve setpoint current $I_{Soll}^{DRV}$. By way of example, the following assumptions will now be made:

$$P_{soll}=2000 \text{ bar}$$

$$P_{SD}=1500 \text{ bar}$$

$$V_{Soll}^{DRV}=0 \text{ l/min}$$

According to FIG. 6, in this case the constant pressure regulating valve setpoint current 0.879 A has been calculated. Said value W is shown hashed in the table. As the first, shaded row Z of the pressure regulating valve characteristic field for the pressure regulating valve setpoint current 0 l/min shows, in the case of a rising rail pressure, greater energization of the pressure regulating valve is necessary in order to hold said valve closed. As the rail pressure $p_{ist}$ corresponding to FIG. 5 following the failure of the high-pressure sensor rises at the point in time $t_1$, for which reason the pressure regulating valve opens, and indeed opens further, the higher the rail pressure rises. At the point in time $t_3$, the pressure regulating valve opens so far that the fuel volumetric flow delivered by the high-pressure pump exactly equals the sum of the injected fuel volumetric flow, the discharged pressure regulating valve volumetric flow and the fuel leakage volumetric flow. The result of this is that the rise in the high pressure $p_{ist}$ is ended and starts to fall again. As a result, the pressure regulating valve is closed again until the high-pressure finally rises again, etc. As a result, there is a high-pressure limit cycle, i.e. a periodic oscillation, wherein the high pressure swings between an upper limit value $p_{max}$ and a lower limit value $p_{min}$.

The energization period of the injectors is calculated as the output variable of the injector characteristic field. The input variables of the injector characteristic field are the measured rail pressure $p_{mess}$ and the setpoint injection quantity $Q_{Soll}$. Following failure of the high-pressure sensor, the input variable $p_{mess}$ of the injector characteristic field remains constant and is equal to the value $p_{SD}$, whereas the actual rail pressure rises and then changes to a continuous oscillation. The result of this is that a false energization period is calculated and as a result the oscillations of the rail pressure are transferred to the revolution rate control circuit, so that the engine revolution rate $n_{mess}$ is also stimulated to oscillate. If the engine revolution rate $n_{mess}$ is oscillating, then the setpoint torque $M_{Soll}$ also oscillates, because the same is calculated as a function of the engine revolution rate.

As the setpoint high pressure $p_{Soll}$ is calculated as the output variable of a three-dimensional characteristic field with the input variables engine revolution rate and setpoint torque, oscillations of the setpoint high pressure can also occur depending on the parameterization of the characteristic field. This is indicated in FIG. 5 by a dotted graph.

If the high-pressure sensor fails and the output value of the sensor remains constant, then as described unstable behavior of the engine can occur, whereby the engine can be damaged. In order to protect the engine, a defect of this type in the high-pressure sensor must be detected and an emergency operation function must be activated, wherein the engine is operated in a stable manner with the suction choke open and the pressure regulating valve open. On detecting the sensor defect, a suitable fault message must be issued to the operator of the engine.

It is thus the object of invention to detect failure of the high-pressure sensor when the measurement value is constant. Three designs of the invention for this are described below.

Figure 7:
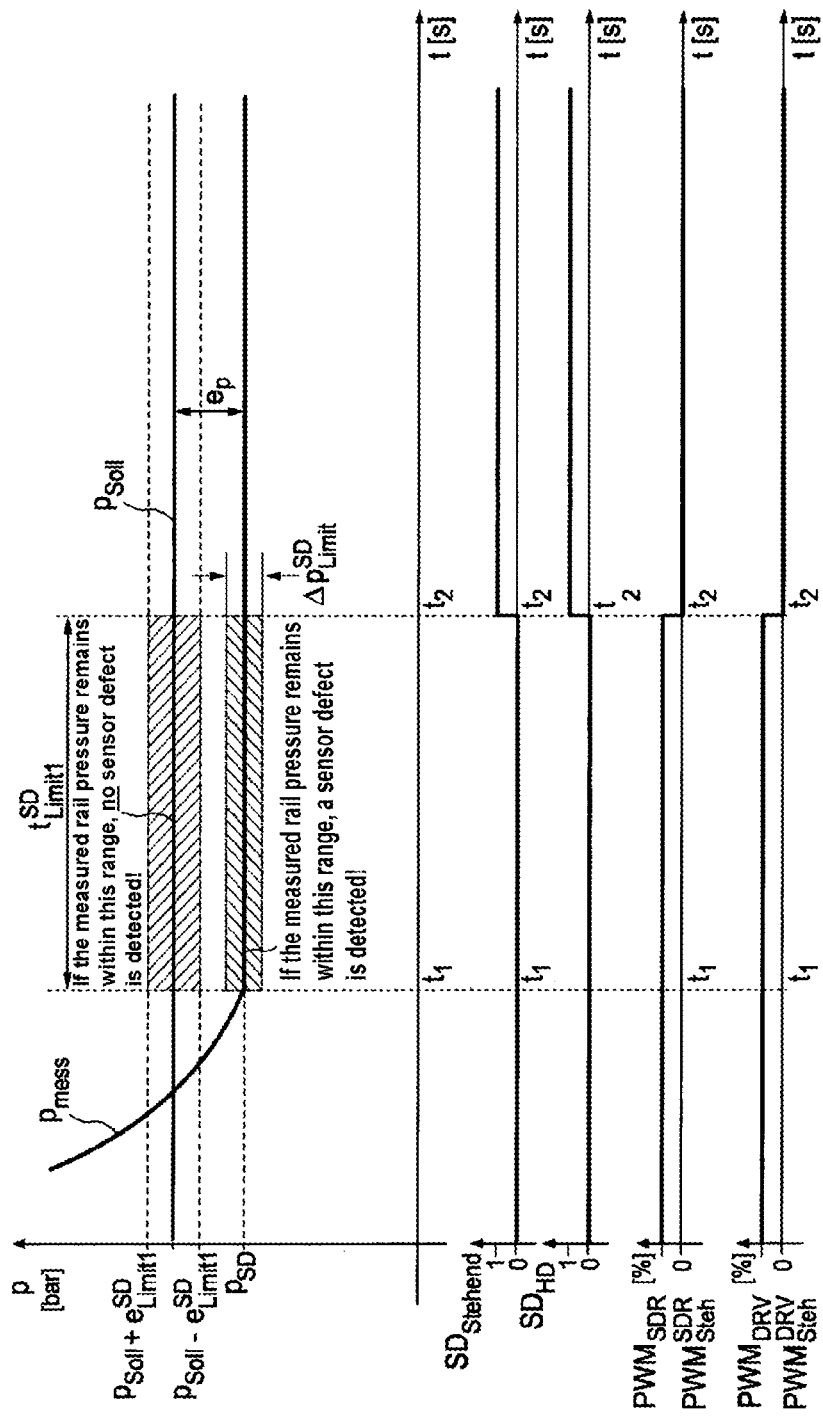
FIG. 7 shows a time profile diagram of a preferred embodiment of a method for detecting a high-pressure sensor failure.

The first design of the invention is represented in FIG. 7. The diagram shows the rail pressure $P_{mess}$ represented by a thick line, which initially decreases, then at the point in time $t_1$ remains at the value $p_{SD}$, as the high-pressure sensor fails. The setpoint high pressure $p_{Soll}$ is constant, which is indicated by a solid thin line. In accordance with the method according to the invention, a check is carried out as to whether the measured rail pressure $p_{mess}$ is in the brightly marked region during a period of time $t_{Limit1}^{SD}$. Said region is a range of pressure values with a width defined by the value $\Delta p_{Limit}^{SD}$. The magnitude of the value $\Delta p_{Limit}^{SD}$ is typically 5 in this case, the period of time $t_{Limit1}^{SD}$ is typically 5 seconds. Furthermore, a check is carried out as to whether the rail pressure deviates from the setpoint high pressure in magnitude by at least the value $e_{Limit1}^{SD}$ during the same period of time $t_{Limit1}^{SD}$, i.e. whether the high-pressure control error $e_p$ corresponds in magnitude at least to the value $e_{Limit1}^{SD}$. According to FIG. 7, the rail pressure may not therefore remain within the dark characterized region if a sensor defect is to be detected. If both conditions are met, i.e. the measured rail pressure changes during the specifiable period of time $t_{Limit1}^{SD}$ only by no more than $0.5*\Delta P_{Limit}^{SD}$ and the rail pressure deviates in magnitude from the setpoint high pressure $P_{Soll}$ by more than $e_{Limit1}^{SD}$ at the same time, then at the point in time $t_2$ a sensor defect of the rail pressure is detected. Said sensor defect is indicated by a separate alarm, which indicates that it is a defect caused by a static measurement value. Accordingly, the binary variable $SD_{Stehend}$ in the second diagram changes from the value 0 to the value 1 at the point in time $t_2$. Likewise, at the point in time $t_2$ the binary variable $SD_{HD}$ changes from the value 0 to the value 1, whereby it is indicated that there is a high-pressure sensor defect, without accurately classifying said defect. If a high-pressure sensor defect occurs, the high-pressure regulator emergency mode is activated, i.e. at the point in time $t_2$, both the switch-on duration $PWM_{SDR}$ of the PWM signal of the suction choke and the switch-on duration $PWM_{DRV}$ of the PWM signal of the pressure regulating valve are reduced from the static values $PWM_{Stat}^{SDR}$ and $PWM_{Stat}^{DRV}$ thereof to the value 0%.

As a result, the suction choke and the pressure regulating valve are opened, because both control elements are normally open, and the engine can thus be operated in the safe emergency mode. This is indicated by diagrams three and four.

Figure 8:
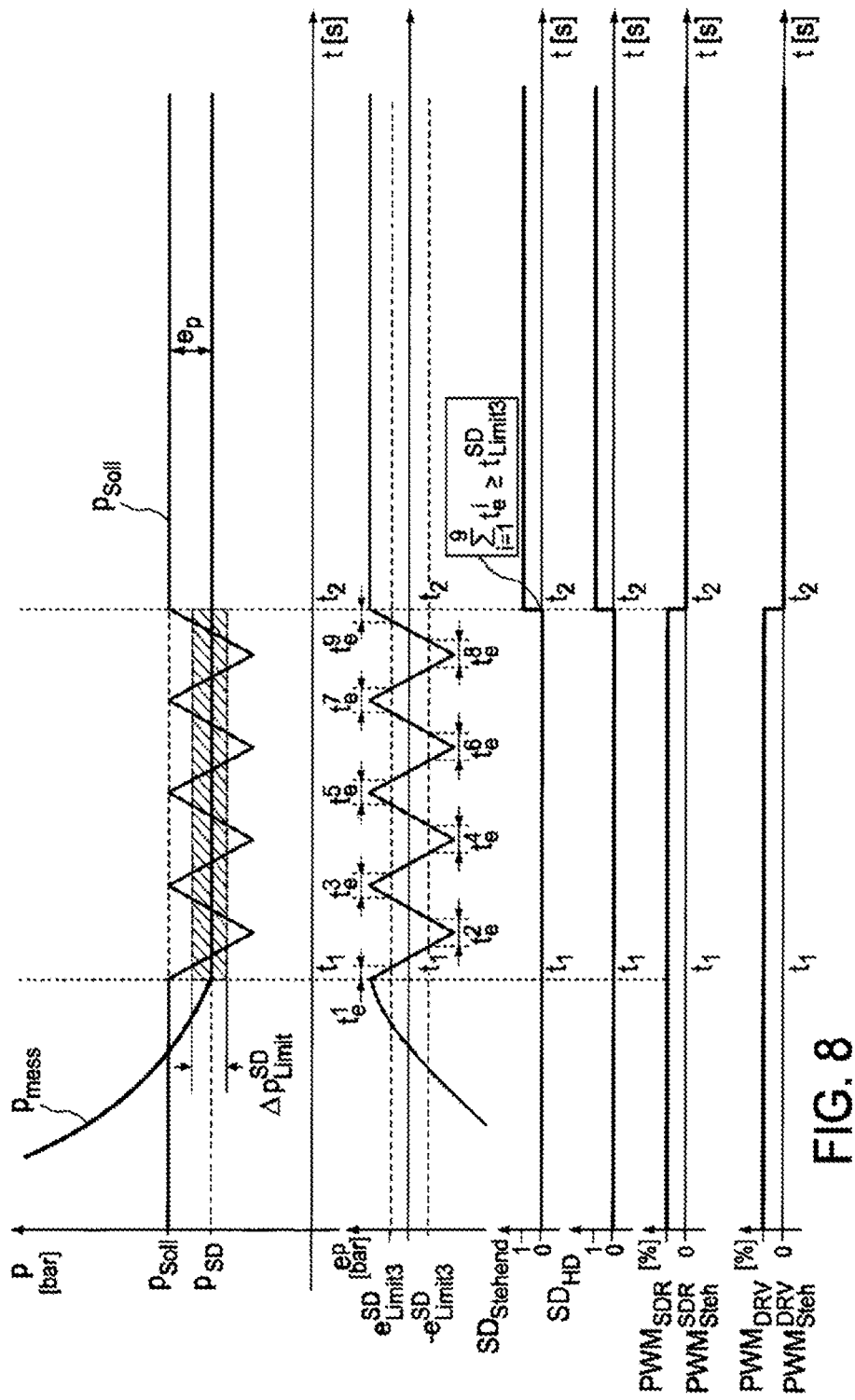
FIG. 8 shows a time profile diagram of a preferred embodiment of a method for detecting a high-pressure sensor failure in the case of a setpoint high pressure value varying over the limited time period.

The second design of the invention is represented in FIG. 8. The first diagram again shows the rail pressure $p_{mess}$ represented by a thick line, which initially decreases, then remains static at the value $p_{SD}$ at the point in time $t_1$, as the high-pressure sensor fails. The setpoint high pressure $p_{Soll}$ is not constant in this case, but swings periodically about the measured rail pressure $p_{mess}$, i.e. here it is the dotted variation of the setpoint high pressure represented in FIG. 5. The second diagram shows the high-pressure control error $e_p$:

$$e_p = p_{soll} - p_{mess}$$

With this design of the invention, the total time $t_{Gesamt}^{SD}$, during which the high-pressure control error $e_p$ is greater in magnitude than a specifiable limit value $e_{Limit1}^{SD}$, is detected:

$$t_{Gesamt}^{SD} = t_e^1 + t_e^2 + t_e^3 + \ldots$$

if said total time is greater than or equal to a specifiable time limit $t_{Limit3}^{SD}$ and at the same time the measured rail pressure changes in magnitude by no more than $0.5*\Delta p_{Limit}^{SD}$, i.e. the measured rail pressure remains in the region shown in grey at the same time, then a sensor defect of the high-pressure sensor is detected and the high-pressure regulator emergency mode is activated. This means that the binary variable $SD_{Stehend}$, which indicates a static measurement value of the high-pressure sensor, changes from the value 0 to the value 1 at the point in time $t_2$. This is indicated in the third diagram. The binary variable $SD_{HD}$, which primarily indicates a high-pressure sensor defect, changes from the value 0 to the value 1 at the point in time $t_2$, which is represented in the fourth diagram. Diagrams five and six again indicate that the emergency mode is activated in the case of a high-pressure sensor defect, i.e. that then both the switch-on duration $PWM_{Soll}$ of the PWM signal of the suction choke and the switch-on duration $PWM_{DRV}$ of the PWM signal of the pressure regulating valve are reduced from the static values thereof $PWM_{Stat}^{SDR}$ and $PWM_{Stat}^{DRV}$ to the value 0%.

It is particularly advantageous with said design of the invention that a sensor defect of the high-pressure sensor as a result of a static measurement value is also detected if the setpoint high pressure oscillations are carried out about the measured high pressure. Typical values for $e_{Limit3}^{SD}$ and $t_{Limit3}^{SD}$ are 10 bar and 3 seconds with this method.

Figure 9:
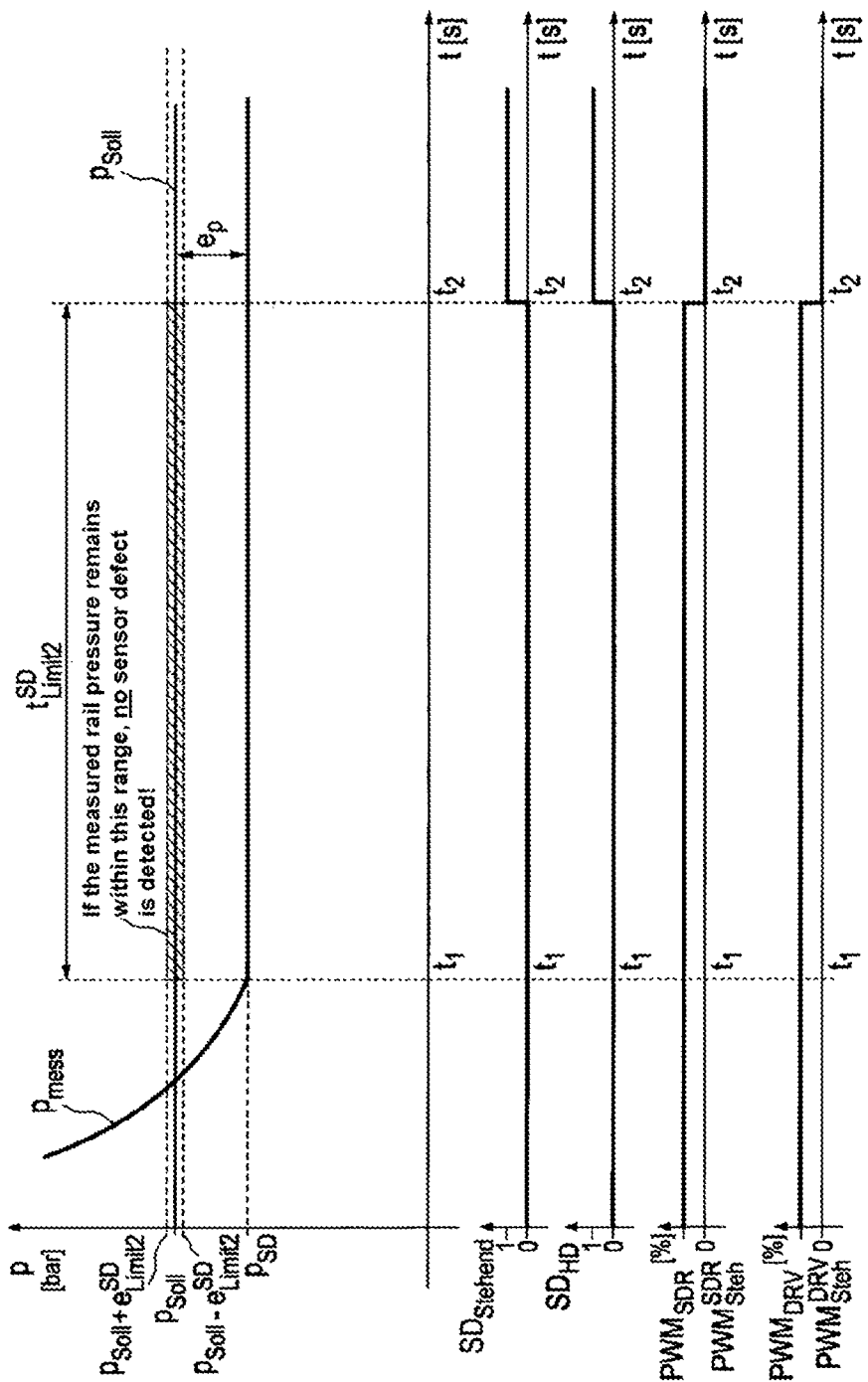
FIG. 9 shows a time profile diagram of a preferred embodiment of a method for detecting a high-pressure sensor failure with a different imposed range of pressure values.

FIG. 9 shows a third design of the invention. In the first diagram, the measured rail pressure $p_{mess}$ is again represented. At the point in time $t_1$, the high-pressure sensor fails, resulting in the corresponding measurement value remaining static. The same diagram also illustrates the setpoint high pressure $p_{Soll}$, which is assumed to be constant. With this method, a sensor defect of the high-pressure sensor is then detected if the measured rail pressure deviates in magnitude from the setpoint high pressure $p_{Soll}$ at least by the value of the also specifiable value $e_{Limit2}^{SD}$ during the specifiable period of time $t_{Limit2}^{SD}$. In this case, the value $e_{Limit2}^{SD}$ is typically very small, set for example to 2 bar, whereas the period of time $t_{Limit2}^{SD}$ is typically set to a very large value, for example 60 seconds. At the point in time $t_2$, after expiry of the period of time $t_{Limit2}^{SD}$, the sensor defect of the high-pressure sensor is detected and the binary variables $SD_{Stehend}$ and $SD_{HD}$ change from the value 0 to the value 1. At the same time, the variables $PWM_{SDR}$ and $PWM_{DRV}$ change to the value 0%.

With this version of sensor defect detection, it does take longer until a sensor defect is detected, but in return said method is particularly reliable because of the small set value of the variable $e_{Limit2}^{SD}$.

Figure 10:
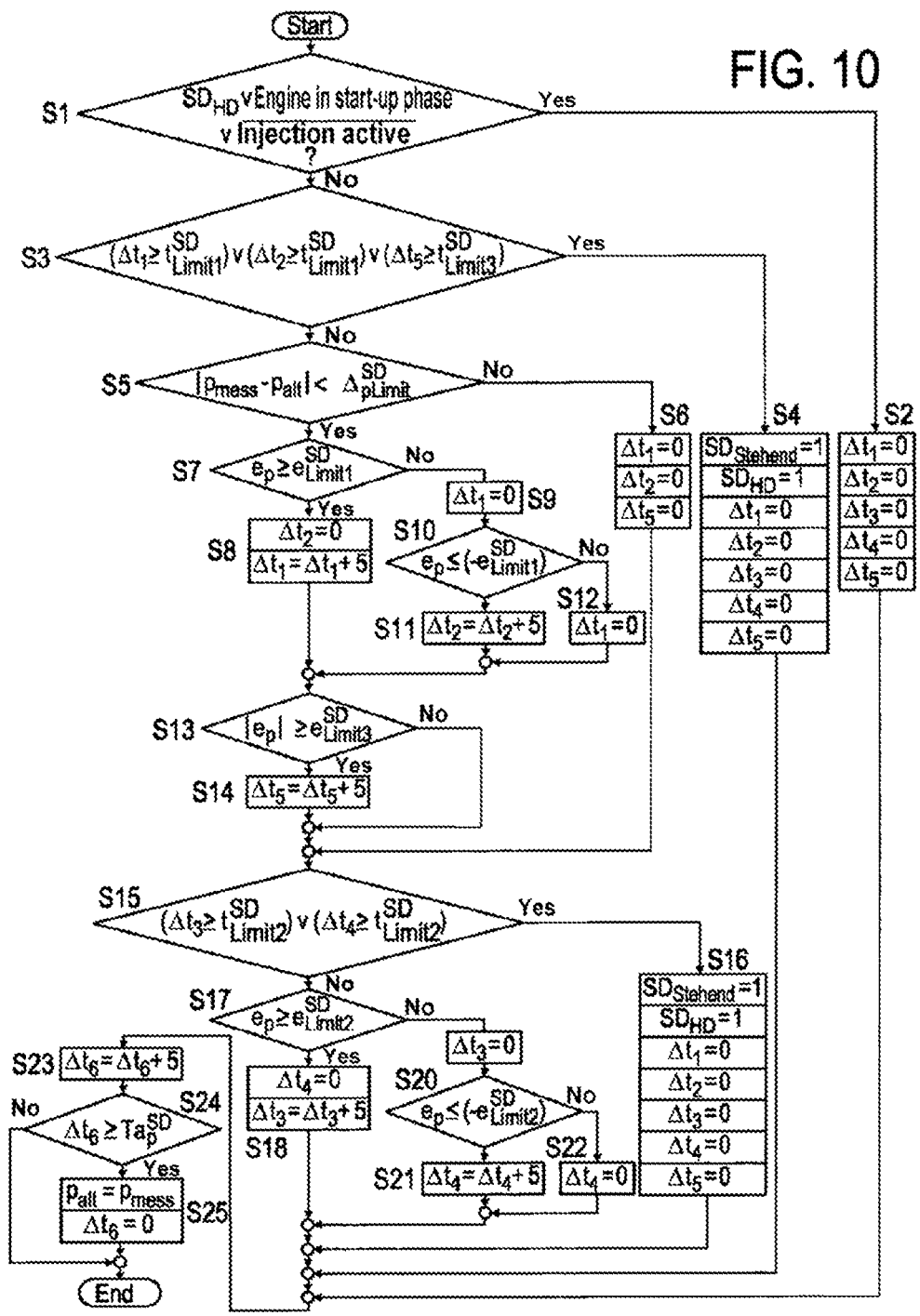
FIG. 10 shows a flow chart of the implementation of all configurations of a preferred embodiment of a method.

FIG. 10 shows the implementation of all designs of the method according to the invention mentioned in the form of a flow chart. In the step S1, a query is made as to whether either the high-pressure sensor is defective or the engine is still in the starting phase or the injection is not yet enabled. If this is the case, the process continues at step S2. In step S2, the time variables $\Delta t_1$, $\Delta t_2$, $\Delta t_3$, $\Delta t_4$ and $\Delta t_5$ are set to the value 0. As a result, the process continues at step S23.

If the result of the query in step S1 is negative, the process is continued at step S3. Here the query is made as to whether the two time variables $\Delta t_1$ or $\Delta t_2$ are greater than or equal to the time limit $t_{Limit1}^{SD}$ or whether the time variable $\Delta t_5$ is greater than or equal to the time limit $t_{Limit3}^{SD}$. In the event of a positive result of the query, the process is continued at step S4. In this case, the variables $SD_{Stehend}$ and $SD_{HD}$ are set to the value 1. At the same time, the time variables $\Delta t_1$, $\Delta t_2$, $\Delta t_3$, $\Delta t_4$ and $\Delta t_5$ are set to the value 0. Then the process is continued at step S23 here too. If the result of the query in step S3 is negative, the process is continued at step S5. In step S5, the magnitude of the difference of $p_{mess}$ and the stored recent measurement value $p_{alt}$ up to the period of time $Ta_p^{SD}$ is formed and a check is carried out as to whether said magnitude is less than the limit value $\Delta P_{Limits}^{SD}$.

An investigation is also conducted as to whether the current measured rail pressure $P_{mess}$ has changed by less than $\Delta P_{Limits}^{SD}$ during the period of time $Ta_p^{SD}$. If this is not the case, the process is continued at step S6 and the time variables $\Delta t_1$, $\Delta t_2$ and $\Delta t_5$ are reset to the value 0. If this is the case on the other hand, a check is carried out in step S7 as to whether the high-pressure control error $e_p$ is greater than or equal to the limit value $e_{Limit1}^{SD}$. If this is the case, the time variable $\Delta t_2$ is set to the value 0 in the step S8 and the time variable $\Delta t_1$ is incremented by the value 5. Then the process is continued at step S13. If the high-pressure control error $e_p$ is less than the limit value $e_{Limit1}^{SD}$, then the process is continued at step S9. In this case, the time variable $\Delta t_1$ is set to the value 0. In the step S10 a check is then carried out as to whether the high-pressure control error $e_p$ is less than or equal to the negative limit value $e_{Limit1}^{SD}$. If this is the case, the time variable $\Delta t_2$ is incremented by the value 5 in the step S11. If this is not the case, the time variable $\Delta t_1$ is set to the value 0 in the step S12. In both cases, the process is continued at step S13. In this case, a check is carried out as to whether the high-pressure control error $e_p$ is greater than or equal to the specifiable limit value $e_{Limit3}^{SD}$ in magnitude. If this is the case, the time variable $\Delta t_5$ is incremented in step S14 by the value 5 and then the process is continued at step S15. If this is not the case, the process is likewise continued at step S15. In step S15, a check is carried out as to whether the time variable $\Delta t_3$ or the time variable $\Delta t_4$ is greater than or equal to the specifiable time limit $t_{Limit2}^{SD}$. If this is the case, the variables $SD_{Stehend}$ and $SD_{HD}$ are set to the value 1 in step S16. At the same time, the time variables $\Delta t_1$, $\Delta t_2$, $\Delta t_3$, $\Delta t_4$ and $\Delta t_5$ are set to the value 0. Then the process is continued at step S23. If the result of the query in the step S15 is negative, the process is continued at step S17. In step S17, a check is carried out as to whether the high-pressure control error $e_p$ is greater than or equal to the specifiable limit value $e_{Limit2}^{SD}$. If this is the case, the time variable $\Delta t_4$ is set to the value 0 in step S18. At the same time, the time variable $\Delta t_3$ is incremented by the value 5. Then the process is continued at step S23. If the result of the query in step S17 is negative, the process is continued at step S19. In this case, the time variable $\Delta t_3$ is set to the value 0. Then the process is continued at step S20. In step S20, a check is carried out as to whether the high-pressure control error $e_p$ is less than or equal to the negative limit value $e_{Limit2}^{SD}$. If this is the case, the time variable $\Delta t_4$ is incremented by the value 5 in step S21. If this is not the case, the time variable $\Delta t_4$ is set to the value 0 in step S22. In both cases, the process is continued at step S23. In step S23, the time variable $\Delta t_6$ is incremented by the value 5. Then the process is continued at step S24. In step S24, a check is carried out as to whether the time variable $\Delta t_6$ is greater than or equal to the specifiable period of time $Ta_p^{SD}$. If this is the case, the current measured rail pressure $p_{mess}$ is stored by setting the variable $p_{alt}$ to $p_{mess}$. The variable $p_{alt}$ is thereby updated after each expiry of the period of time $Ta_p^{SD}$ and, as already mentioned, is compared with the current measured rail pressure $p_{mess}$ in the step S5. In the step S5, a check is thus carried out as to how much the measured rail pressure changes within the period of time $Ta_p^{SD}$. The implementation of the invention in this way is very advantageous, since ring memories, which require a great deal of memory space, can be omitted. Moreover, as a result a great deal of computing time can be saved.

In step S25, in addition the time variable $\Delta t_6$ is reset to the value 0. Then the program execution is ended. If the result of the query in step S24 is negative, the program execution is also ended.

REFERENCE CHARACTER LIST 1 internal combustion engine
3 injection system
5 low-pressure pump
7 fuel reservoir
9 suction choke
11 high-pressure pump
13 high-pressure reservoir
15 injectors
16 combustion chambers
17 single reservoir
19 pressure regulating valve
21 control unit
23 high-pressure sensor
A output variable
E input variable
  $p_E$ individual storage pressure
  FP signal
  $n_1$ engine revolution rate
  p high-pressure
  PWMDR signal
V
  VDRV high-pressure interference variabl
  ve signal

The invention claimed is:

1. A method for operating an internal combustion engine having a number of cylinders and an injection system comprising high pressure components including a common rail with a respective injector associated with each of the cylinders, wherein the method comprises the steps of:
  injecting fuel from the common rail into each cylinder by way of the respective injector;
  determining a fuel pressure for a high-pressure component using at least one high-pressure sensor; and
  detecting a defect of the high-pressure sensor by checking whether a high-pressure control error ($e_p$) exceeds a predetermined limit value ($e_{Limit1}^{SD}$, $e_{Limit2}^{SD}$, $e_{Limit3}^{SD}$) in magnitude during a predetermined period of time ($t_{Limit1}^{SD}$, $t_{Limit2}^{SD}$, $t_{Limit3}^{SD}$), wherein output values of the high-pressure sensor ($p_{mess}$) remain in a region that is defined by a maximum deviation ($\Delta p_{Limit}^{SD}$) during a course of the predetermined period of time ($t_{Limit1}^{SD}$, $t_{Limit3}^{SD}$), wherein a defect of the high-pressure sensor is detected by detecting a variation with time of output values ($p_{mess}$) of the at least one high-pressure sensor and detecting a variation of the detected output value (pmess) that is constant or only variable to a limited extent within a predetermined limited range of values, and wherein for the predetermined limited range of values for the predetermined period of time ($t_L$imit1SD, $t_L$imit2SD, $t_L$imit3SD), the maximum deviation ($\Delta p_L$imitS$^D$) of a range of pressure values is set and the variation of the detected output value (pmess) in the predetermined limited range of values is detected using a test condition, wherein the detected output value over the predetermined period of time ($t_L$imit1SD, $t_L$imit2SD, $t_L$imit3SD) does not exceed the maximum deviation) ($\Delta p_L$imit$^{SD}$).

2. The method according to claim 1, wherein the predetermined period of time $t_{Limit1}^{SD}$ and $t_{Limit2}^{SD}$ is a continuous period of time.

3. The method according to claim 1, wherein the predetermined period of time $t_{Limit3}^{SD}$ is a total time.

4. The method according to claim 1, wherein a setpoint high pressure ($p_{soll}$) with a predetermined limit value ($e_{Limit1}^{SD}$) of the high-pressure control error is provided and the variation of the detected output value ($p_{mess}$) in the predetermined limited range of values is detected using a further test condition, wherein the output value detected over the predetermined period of time ($t_{Limit1}^{SD}$, $t_{Limit2}^{SD}$, $t_{Limit3}^{SD}$) does not lie in a control range for the setpoint high pressure ($p_{soll}$) formed by the predetermined limit value ($e_{Limit1}^{SD}$) for a high-pressure control error.

5. The method according to claim 1, wherein a setpoint high pressure ($p_{soll}$) has a variable profile that lies both within and outside the pressure value limit range and the variation of the detected output value ($p_{mess}$) within the predetermined limited range of values is detected using a still further test condition, wherein the output values detected over a further limiting time period remain within the range of pressure values characterized by a maximum deviation ($\Delta p_{Limit}^{SD}$), and the further limiting time period is made up of non-contiguous individual time periods that are accumulated to form the predetermined period of time ($t_{Limit3}^{SD}$) and the high-pressure control error ($e_p$) is greater in magnitude than the predetermined limit value ($e_{Limit3}^{SD}$) during one or a number of or all individual time periods.

6. The method according to claim 1, including bringing about a safe emergency mode of the internal combustion engine in response to a fault condition ($SD_{Stehend}$).

7. The method according to claim 6, including outputting a fault message to an operator of the internal combustion engine as a further response to the fault condition ($SD_{Stehend}$).

8. The method according to claim 1, wherein the predetermined period of time ($t_{Limit1}^{SD}$) is 4-6 seconds and the predetermined limit value ($\Delta p_{Limit}^{SD}$) is 2-6 bar.

9. The method according to claim 1, including operating the internal combustion engine in a safe emergency mode with a suction choke open and a pressure regulating valve open.

10. A device, comprising: an engine controller and an injection computer module configured to carry out a method according to claim 1 for controlling the internal combustion engine.

11. The method according to claim 1, wherein a single reservoir is associated with each injector and is configured to hold fuel from the common rail for the injector, wherein the fuel pressure is determined for the high-pressure temperatures.

* * * * *